United States Patent [19]

Fujisawa et al.

[11] Patent Number: 4,868,067
[45] Date of Patent: Sep. 19, 1989

[54] COOPERATING SLIDABLE ALUMINUM ALLOY MEMBERS

[75] Inventors: Yoshikazu Fujisawa; Tadayoshi Hayashi; Hideaki Ushio; Kazuo Shibata, all of Saitama, Japan

[73] Assignee: Honda Giken Kogyo Kabushiki Kaisha, Tokyo, Japan

[21] Appl. No.: 194,836

[22] Filed: May 17, 1988

Related U.S. Application Data

[63] Continuation-in-part of Ser. No. 908,197, Sep. 17, 1986, abandoned.

[30] Foreign Application Priority Data

Sep. 17, 1985 [JP] Japan .................................. 60-204665

[51] Int. Cl.⁴ .......................... C22C 1/09; B32B 15/08; F16J 1/01
[52] U.S. Cl. ..................... 428/614; 428/634; 428/626; 428/654; 428/458; 123/193 CP; 123/193 P; 92/155
[58] Field of Search ......... 123/193 C, 193 CP, 193 P; 428/614, 591, 624–626, 687, 654, 686, 634, 458; 92/155, 222, 223

[56] References Cited

U.S. PATENT DOCUMENTS

| | | | |
|---|---|---|---|
| ',890,950 | 6/1975 | Haldeman | 123/193 CP |
| 4,395,442 | 7/1983 | Meise et al. | 123/193 C |
| 4,457,979 | 7/1984 | Donomoto et al. | 428/614 |
| 4,466,399 | 8/1984 | Hinz et al. | 123/193 CP |
| 4,498,219 | 2/1985 | Ban et al. | 123/193 P |
| 4,643,078 | 2/1987 | Ban | 123/193 P |
| 4,696,866 | 9/1987 | Tanaka et al. | 428/614 |

FOREIGN PATENT DOCUMENTS

| | | | |
|---|---|---|---|
| 2458444 | 6/1975 | Fed. Rep. of Germany | 123/193 P |
| 2484042 | 12/1981 | France | 123/193 P |
| 91350 | 5/1983 | Japan | 123/193 P |
| 200043 | 11/1984 | Japan | 123/193 P |
| 79142 | 5/1985 | Japan | 123/193 P |
| 182338 | 9/1985 | Japan | 123/193 C |

*Primary Examiner*—John J. Zimmerman
*Attorney, Agent, or Firm*—Lyon & Lyon

[57] ABSTRACT

Cooperating slidable aluminum alloy members comprising first and second slidable aluminum alloy members that have a slide portion and slide surface, respectively, which slide relative to each other. The slide portion of the first slidable aluminum alloy member is being comprised of a fiber-reinforced aluminum alloy. The reinforcement fiber used for the first slidable aluminum alloy member being a mixture of an alumina fiber and a carbon fiber. The slide surface of the second slidable member is provided with a layer of heat resistant synthetic resin in which are dispersed a solid lubricant and an abrasion resistance improving agent.

4 Claims, 7 Drawing Sheets

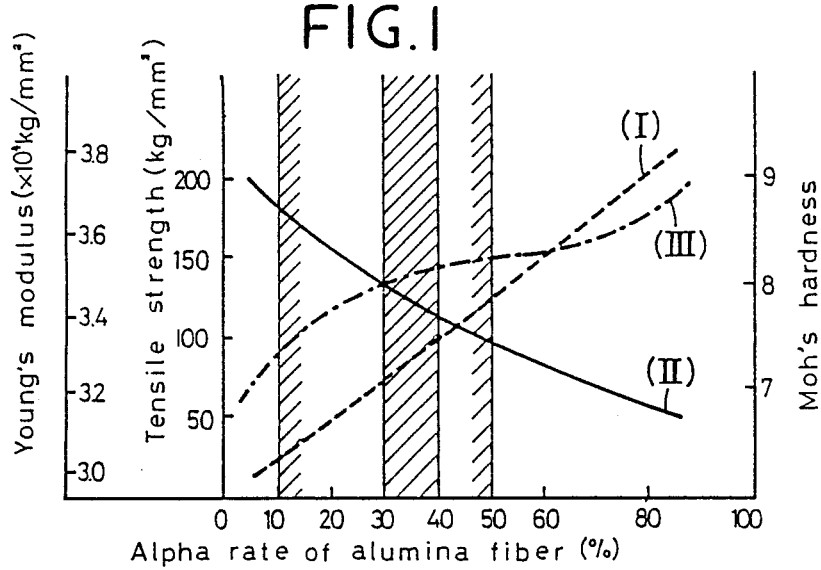
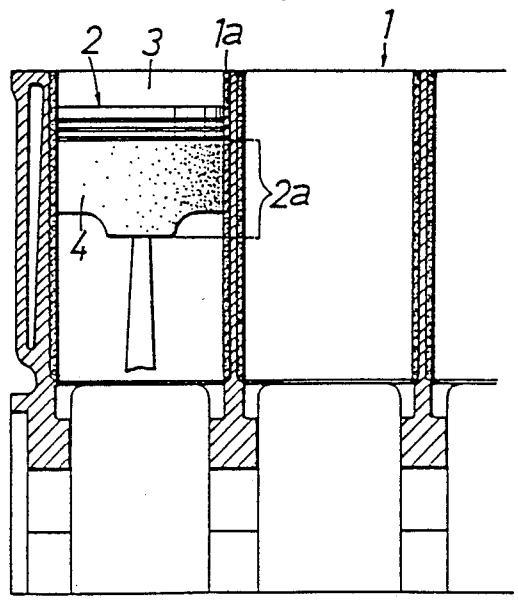

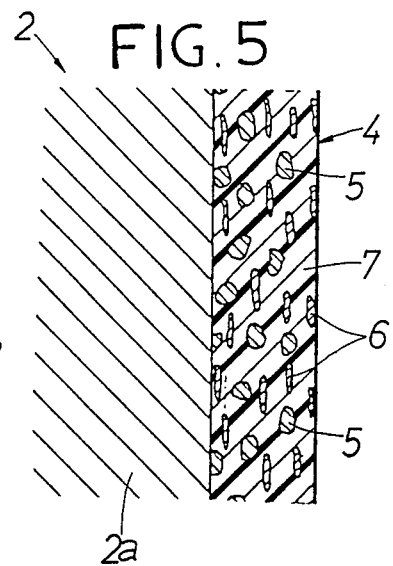
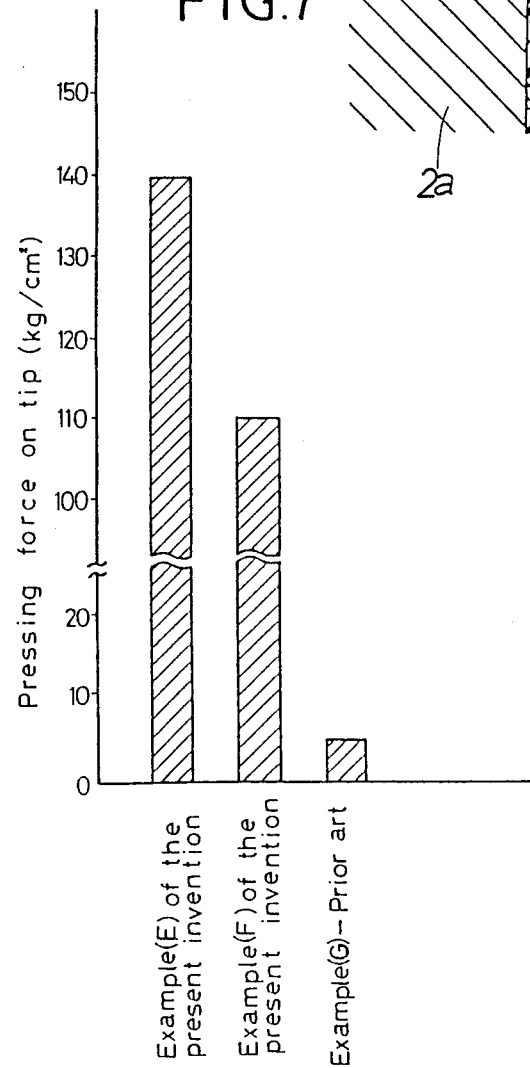

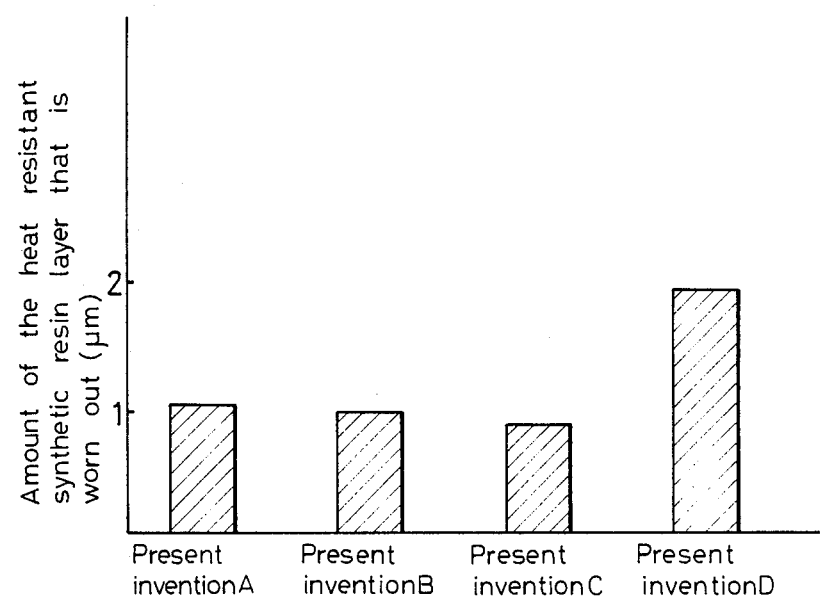

COOPERATING SLIDABLE ALUMINUM ALLOY MEMBERS

This application is a Continuation-In-Part of Application Ser. No. 908,197, filed Sept. 17, 1986 now abandoned.

BACKGROUND OF THE INVENTION

The present invention relates to cooperating slidable aluminum alloy members, and more particularly, to an improvement in first and second slidable aluminum alloy members that slide relative to each other and in which a sliding portion of the first slidable aluminum alloy member is comprised a fiber-reinforced aluminum alloy.

Cooperating slidable members of this kind can be represented, for example, by the combination of a cylinder block of an internal combustion engine and a piston that is slidably fitted in a cylinder bore of the cylinder block. According to the prior art, a particulr region on the inner wall of the cylinder bore includes a single kind of fiber for reinforcement in an aluminum alloy matrix (see, for example, Japanese Patent Laid-Open No. 182338/1985).

It is desired that the inner wall of the cylinder bore has at least a predetermined strength as well as self-lubricating ability to obtain good sliding properties under the conditions where the circulating oil lubrication is not sufficiently effected, such as at the time of starting the engine. However, use of a single kind of fiber for reinforcement is not sufficient to properly meet such requirements.

When an alumina fiber is selected as a reinforcement fiber, furthermore, the alpha rate of the alumina fiber so seriously affects the strength and hardness of the fiber that the alpha rate must be set to a suitable value. When the volume content of the alumina fiber is not appropriate, even if the alumina fiber has an appropriate strength, the inner wall of the cylinder bore is not sufficiently reinforced with that fiber thereby causing an increase in the amount of wear in the inner wall of the cylinder bore and the piston.

Both of the slidable surfaces of the cylinder block and piston comprised an aluminum alloy are of the same material, and if means are not provided between the surfaces for preventing adhering and seizure between them, there is a risk that the two relatively sliding portions will adhere when the members are stationary thereby inhibiting relative sliding motion when needed, such as upon starting the engine, particularly due to lack of lubrication between the members as a result of the engine being stopped for awhile. In addition, it is also possible that a seizure will occur between the two members during operation.

The above-mentioned problems can be caused not only in internal combustion engines but between any two sliding members that slide relative to each other during operation such as in a compressor, an automatic transmission, or a like unit.

SUMMARY OF THE INVENTION

The object of the present invention is to provide a combination of a first slidable aluminum alloy member with a slide portion having a predetermined strength and self-lubricating property and a second slidable aluminum alloy member with a particular slide surface, featuring improve sliding characteristics.

In order to achieve the above-mentioned object of the present invention, there are provided cooperating slidable aluminum alloy members comprising first and second aluminum alloy members that slide relative to each other, in which the slide portion of said first slidable aluminum alloy member is comprised of a fiber-reinforced aluminum alloy, wherein the reinforcement fiber used for said first slidable aluminum alloy member is a mixture of an alumina fiber of a volume content of 8.0 to 20.0% and a carbon fiber of a volume content of 0.3 to 15.0%, the alpha rate of said alumina fiber is from 10.0 to 50.0%, the content of shots having an average particle size of 150 or more in the alumina fiber set to be 2.5% or less by weight, the slide surface of said second slidable aluminum alloy member is provided with a layer of a heat resistant synthetic resin of a thickness of from 5 to 50 $\mu$m in which are dispersed a solid lubricant and an abrasion resistance improving agent, said solid lubricant includes one selected from $MOS_2$ particles, BN particles, carbon particles and polytetrafluoroethylene particles, and said abrasion resistance improving agent comprises a copper-type fine substance.

With the volume content of the alumina fiber being set to 8.0 to 20.0% as described above, the slide portion of the first slidable member is sufficiently reinforced with fiber and exhibits improved resistance against abrasion, and yet reducing the wear on the second slidable member.

When the volume content becomes smaller than 8.0%, however, the slide portion is less reinforced with fiber and loses resistance against abrasion and seizure. When the volume content becomes greater than 20.0%, on the other hand, the fillability of the aluminum alloy matrix decreases making it difficult to accomplish satisfactory reinforcement with fiber. Moreover, the hardness of the slide portion increases which increases the amount of wear in the second slidable member and decreases the heat conductivity.

With the volume content of the carbon fiber being set to 0.3 to 15.0% as described above, the slide portion exhibits self-lubricating property, which makes it possible to improve sliding characteristics under the condition where the circulating oil lubrication is not sufficient at a time when the sliding motion is started.

If the volume content of the carbon fiber becomes smaller than 0.3%, however, lubricating effect by the carbon fiber is not exhibited. If the volume content becomes greater than 15.0%, on the other hand, the total volume content becomes so great in relation to the amount of alumina fiber that the moldability is deteriorated when a fibrous molding is obtained by using the mixture of fibers, and the slide portion loses tensile strength as well.

With the alpha rate of the alumina fiber being set to a range from 10.0 to 50.0% as described above, the alumina fiber exhibits an increased strength and a suitable scratch hardness lending itself well for being used as a slide member. If the alpha rate is smaller than 10.0%, however, the scratch hardness decreases. If the alpha rate is in excess of 50.0%, on the other hand, the scratch hardness so increases that the alumina fiber can not be used as a slide member. Also, if the alpha rate is greater than 50.0%, the alumina fiber becomes brittle.

Due to its manufacturing process, the alumina fiber inevitably contains particles that are not in fiber form, i.e., it contains shots. The shots having an average particle size of 150 $\mu$m or more adversely affect the tensile strength and the sliding characteristics of a slide portion in the first slidable member. To avoid adverse affects, the content of shots having an average particle size of 150 μm or more is limited to be 2.5% or less by weight as mentioned earlier.

Owing to the solid lubricant and the resin component, the layer of the heat resistant synthetic resin provided on the slide surface of the second slidable member has non-adhering property relative to the slide portion of the first slidable member. Therefore, the two members never adhere to each other even when the lubricating oil is depleted between the two members after the sliding operation has been stopped for extended periods of time.

As described above, the carbon fiber is used for the slide portion of the first slidable member. The carbon fiber is poorly wet with the lubricating oil and the oil film easily breaks down on the slide portion during the sliding operation. However, the layer of the heat resistant synthetic resin on the side of the second slidable member has a lubricating property which compensates for the degradation of sliding characteristics that result from the breakdown of oil film. Therefore, the drop of surface pressure at the seizure limit is suppressed between the two members.

Furthermore, the abrasion resistance improving agent helps greatly reduce the wearing amount of the layer of the heat resistant synthetic resin, and contributes to improving the durability.

As described above, a combination of the first slidable member and the second slidable member having the particular structure makes it possible to provide cooperating slidable aluminum alloy members that feature improved sliding characteristics.

The above and other objects, features and advantages of the present invention will become obvious from the description of a preferred embodiment mentioned below in conjunction with the accompanying drawings.

BRIEF DESCRIPTION OF THE DRAWINGS

FIG. 1 is a graph illustrating the relationships among properties of the alumina fiber, such as, the alpha rate, the tensile strength and the like;

FIG. 4 is a sectional view taken along the line IV—IV of FIG. 3;

FIG. 5 is a sectional view illustrating a major portion of a piston of this invention on an enlarged scale;

FIG. 6 is a graph illustrating the results of wear test of the layers of heat resistant synthetic resins on the assumption that the engine is in operation;

FIG. 7 is a graph showing the results of seizure limit tests on the assumption that the engine is to be started;

DETAILED DESCRIPTION OF THE PREFERRED EMBODIMENTS

Figure 2:
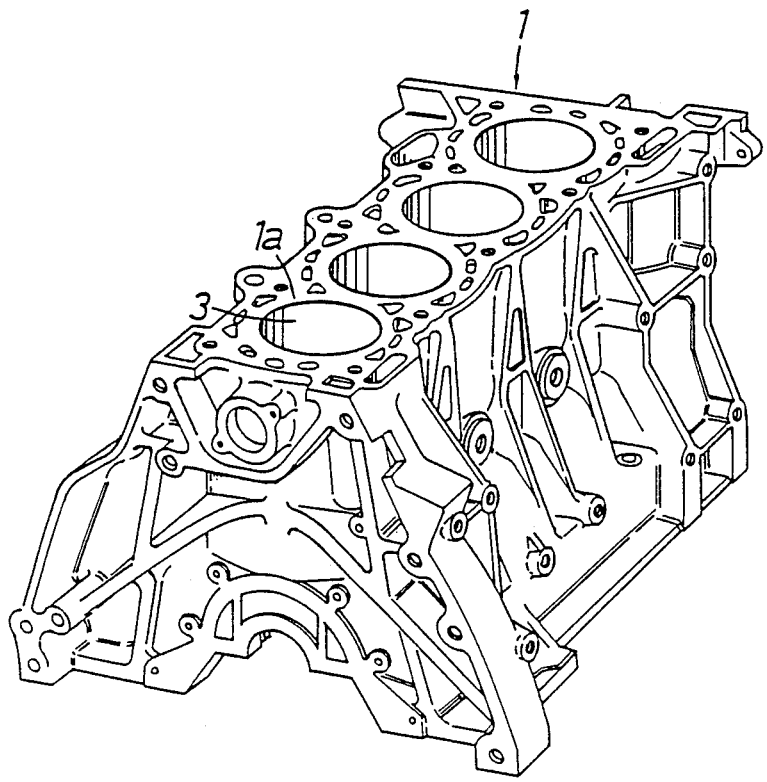
FIG. 2 is a perspective view of a cylinder block.

FIG. 1 illustrates the relationship among the Young's modulus (I), the tensile strength (II) and the Moh's hardness (III) with respect to the alpha rate of the alumina fiber used in this invention. When the alpha rate of the alumina fiber is in a range of from 10.0 to 50.0%, the alumina fiber exhibits a high strength and a scratch harness, i.e., Moh's hardness required for the slidable members. When the alpha rate of the alumina fiber ranges from 30.0% to 40.0%, in particular, the tensile strength of the alumina fiber is not reduced excessively and the scratch hardness is maintained high. By using an alumina fiber of this kind, therefore, optimum sliding characteristics are obtained.

The alumina fibers which may be used are long and short fibers and whiskers, including, for example, Sunfil (trade name) commercially available from ICI Corp., and Fiber FP (trade name) commercially available from E. I. du Pont de Nemours and Company.

In order that the lubricating property is effectively exhibited, the carbon fiber preferably should have a Young's modulus of 20 to 30 t/mm$^2$, an average diameter of 6 to 8 μm and an average length of 100 to 200 μm. With regard to the variations in lengths of the carbon fibers, the fibers having a length of 20 μm or less are limited to 15% or less by weight and the fibers having a length of 300 μm or more are limited to 9% or less by weight.

For the heat resistance synthetic resin, use is made of at least one or more resins preferably selected from the group consisting of polyimide, polyamide and polyamideimide resins.

$MoS_2$ particles or other particles used as the solid lubricant should preferably have an average particle size of from 1 to 5 μm. The reason for limiting the average particle sizes is to have the solid lubricant reliably held by a very thin layer of the heat resistant synthetic resin so that it will not escape therefrom.

Because of the difference in the specific gravities, the upper limits in the added amounts of particles are as follows: 15% by weight for the polytetrafluoroethylene particles, 40% by weight for the $MoS_2$ particles, 20% by weight for the BN particles, and 15% by weight for the carbon particles. From the standpoint of forming the layers, the upper limits should desirably be 3% by weight for the polytetrafluoroethylene particles, 20% by weight for the $MOS_2$ particles, 10% by weight for the BN particles, and 3% by weight for the carbon particles.

The copper-type fine (i.e. copper containing) substance used as the abrasion resistance improving agent may include copper and copper alloy particles as well as thin pieces thereof. Examples of a copper alloy include a Cu-Sn alloy, A Cu-Zn alloy and like alloys. From the standpoint of improving the abrasion resistance it is preferred that the surface areas be as large as possible. For this purpose, it is desired to use thin pieces. The thin pieces should have an average diameter of 1 to 35 μm and should be added in amounts of 1 to 25% by weight. The reasons for these limitations are that if the average diameter of the thin pieces becomes smaller than 1 μm, the abrasion resistance is improved very little and, further, it becomes difficult to produce thin pieces. If the average diameter of thin pieces becomes greater than 35 μm, on the other hand, the abrasion resistance tends to decrease. Moreover, if the amount of thin pieces becomes smaller than 1% by weight, the abrasion resistance is improved very little. If the amount of thin pieces becomes greater than 25% by weight, on the other hand, the amount of wear in the layer of the heat resistant synthetic resin is increased and, furthermore, it becomes difficult to form the synthetic resin layer.

The total amount of the solid lubricant and the abrasion resistance improving agent is 50% or less by weight with respect to the synthetic resin components.

If the total amount exceeds 50% by weight, it becomes difficult to form the layer of heat resistant synthetic resin.

The best thickness of the layer of the heat resistant synthetic resin is from 5 to 50 $\mu$m. The reason is, if the thickness becomes smaller than 5 $\mu$m, the layer becomes too thin and is not capable of exhibiting the desired non-adhering property. On the other hand, if the thickness becomes greater than 50 $\mu$m, the aforementioned function is not improved.

Formation of a chemical film on the surface of a piston as an underlying layer for forming the layer of heat resistant synthetic resin is effective for improving the intimacy for the adhesion of the synthetic resin layer. Examples of the method of treating with a chemical film include (1) an M.B.V. method which effects the treatment by using a mixture solution comprising a chromats and an alkali such as sodium carbonate at a temperature of 70 degrees to 100 decrees C., and (2) an Alodine method which uses a mixture of phosphoric acid, chromic acid and a fluoride. The surface of the film obtained by the M.B.V. method is coarsened to some extent and exhibits good intimacy for the synthetic resin layer.

Figure 3:
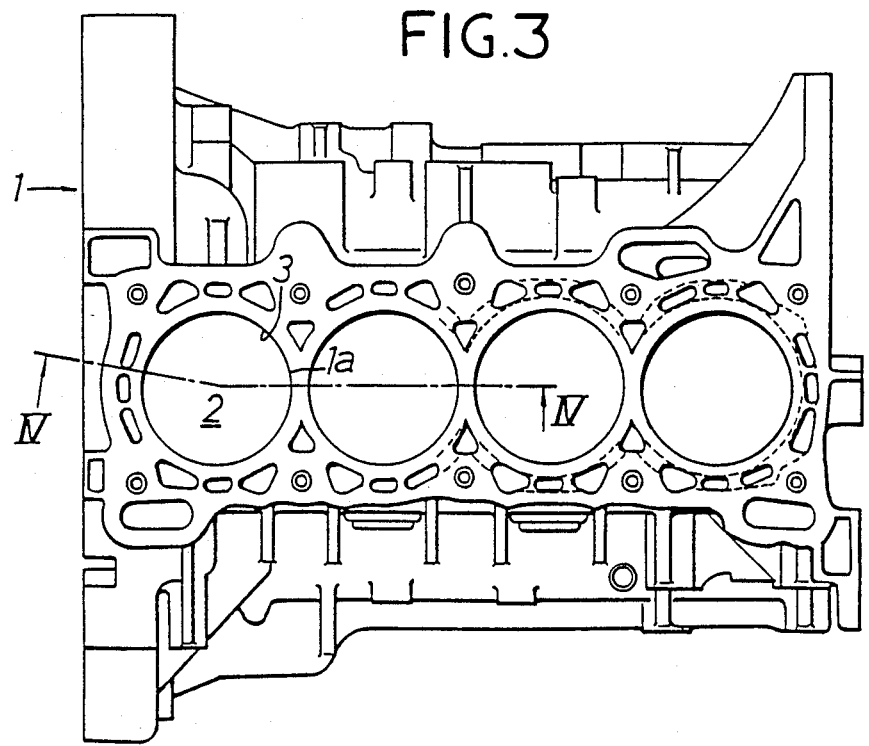
FIG. 3 is a plan view of the cylinder block.

FIGS. 2 to 4 illustrate an internal combustion engine which includes a cylinder block 1 of the Siamese type composed of an aluminum alloy as the first slidable member and a piston 2 made of an aluminum alloy which is slidably fitted into a cylinder bore 3 as the second slidable member in a preferred embodiment of this invention.

The inner wall 1a of the cylinder bore which is a slide portion of the cylinder block 1 is comprised of a fiber-reinforced aluminum alloy using the above-described mixture of alumina fiber and carbon fiber as fibers for reinforcement.

The preferred embodiment of the cylinder block 1 is casted by forming a cylindrical fibrous molded element comprised of alumina fiber of a volume content of 12% and carbon fiber of a volume content of 9%, preheating the cylindrical fibrous element to 300 degrees C., placing the cylindrical fibrous molded element in a metal die cavity preheated to 200 degrees C., and pouring a molten aluminum alloy specified under JIS ADC 12 into the cavity at a temperature of 730 degrees to 740 degrees C. under a filling pressure of 260 kg/cm$^2$. During the casting of the cylinder block, the aluminum alloy is filled into the fiber molded element to produce an inner wall 1a of the cylinder bore comprised of fiber-reinforced aluminum alloy. In this case, the alpha rate of the alumina fiber is 33%, and the shot content having an average particle size of 150 $\mu$m or more is 1.1% by weight.

The preferred embodiment of the piston 2 is casted by using the aluminum alloy specified under JIS ACSH, with a layer 4 of heat resistant synthetic resin being formed on the outer peripheral surface of a skirt portion 2a which forms a slide surface. The layer 4 comprises, as shown in FIG. 5, a polyamideimide resin 7 in which are dispersed MoS$_2$ particles 5, copper-type fine substance 6, and hexadimethyl pyrrolidone that serves as a solvent, followed by baking at a temperature of 190 degrees C. for a period of 30 minutes. The heat resistant synthetic resin layer 4 has a thickness of about 40 $\mu$m. The layer 4 of heat resistant synthetic resin may be provided on the entire outer peripheral surface of the piston 2.

FIG. 6 shows the results of wear tests of the heat resistant synthetic resin layers 4 under conditions that may be encountered when the engine is in operation, by using a tip-on-disk type slide testing machine. In all of the tests, the disk was constructed of the same fiber-reinforced aluminum alloy as that which forms the inner wall 1a of the cylinder bore. On the other hand, the tip was constructed in the same manner as the skirt portion 2a of the piston 2, i.e., of an aluminum alloy and a heat resistant synthetic resin layer 4 formed thereon. The MoS$_2$ particles and cooper-type fine substance were used for the tests A to C of the present invention, but no copper-type fine substance was used for the comparative example D. To the tips A to C of the present invention and to the tip d of the comparative example were added MoS$_2$ particles and like materials in amounts as shown in Table I below, wherein the MoS$_2$ particles have an average particle size of 4 to 5 $\mu$m, and thin copper pieces, thin Cu-Zn alloy pieces and thin Cu-Sn alloy pieces, all have an average diameter of 5 $\mu$m.

TABLE I

| | Additive (% by weight) | | | |
| --- | --- | --- | --- | --- |
| Tip | MoS$_2$ particles | Thin Copper pieces | Thin Cu—Zn alloy pieces | Thin Cu—Sn Alloy pieces |
| A | 10 | 10 | — | — |
| B | 10 | — | 10 | — |
| C | 10 | — | — | 10 |
| D | 15 | — | — | — |

The tests were conducted under the conditions of a rotational speed of the disk of 12.5 m/sec., a pressing force on the tip of 30 kg/cm$^2$, a lubricating oil supply amount of 5 ml/min., and a slide distance of 2000 m.

In the cases A to C of the present invention, as will be obvious from FIG. 6, the amount of wear is reduced to about one-half compared with that of the comparative example D.

FIG. 7 shows the results of seizure limit tests under the assumption that the forced lubrication is not sufficiently effected such as at the start of the engine, obtained by using the tip-on-disk type slide testing machine. In the case E of the present invention, the disk was constructed of the same fiber-reinforced aluminum alloy as the above-described inner wall 1a of the cylinder bore and the tip was constructed in the same manner as the skirt portion 2a of the piston 2, i.e., of an aluminum alloy and heat resistant synthetic resin layer 4 formed thereon. The heat resistant synthetic resin layer was 15% by weight of MoS$_2$ by particles, 15% by weight of thin copper pieces, and 70% by weight of a polyamideimide resin.

The comparative example F was constructed in the same manner as the case E of the present invention except that only alumina fiber was used for the disk and the volume content thereof was 12%.

The example G of a conventional prior art construction for comparison was constructed in the same manner as the case E of the present invention except that the alumina fiber only was used for the disk, with a volume content of being 6% and that the tip was not provided with the heat resistant synthetic resin layer.

The testing method was comprised of rotating the disk at a speed of 2.5 m/sec. and pressing the slide surface of the tip onto the slide surface of the disk with a predetermined pressing force with no lubrication. In the present invention E and in the comparative example F, the synthetic resin layer of the tip engaged to the disk.

In the test of example E of the present invention, as will be obvious from FIG. 7, the tip did not adhere to the disk and the surface pressure of seizure limit was as high as 140 kg/cm$^2$. In the test of the comparative example F, however, the surface pressure was lowered to 110 kg/cm$^2$. This was due to the fact that the disk contained no carbon fiber. In the test of the conventional example G, furthermore, the tip started to adhere to the disk with a pressing force of only about 1.2 kg/cm$^2$, and the surface pressure of seizure limit was as small as about 5 kg/cm$^2$.

In the present invention E, it was confirmed that because of the synthetic resin layer the tip did not adhere to the disk even when the tip was pressed with a predetermined force onto the disk before starting rotation of the disk.

Figure 8:
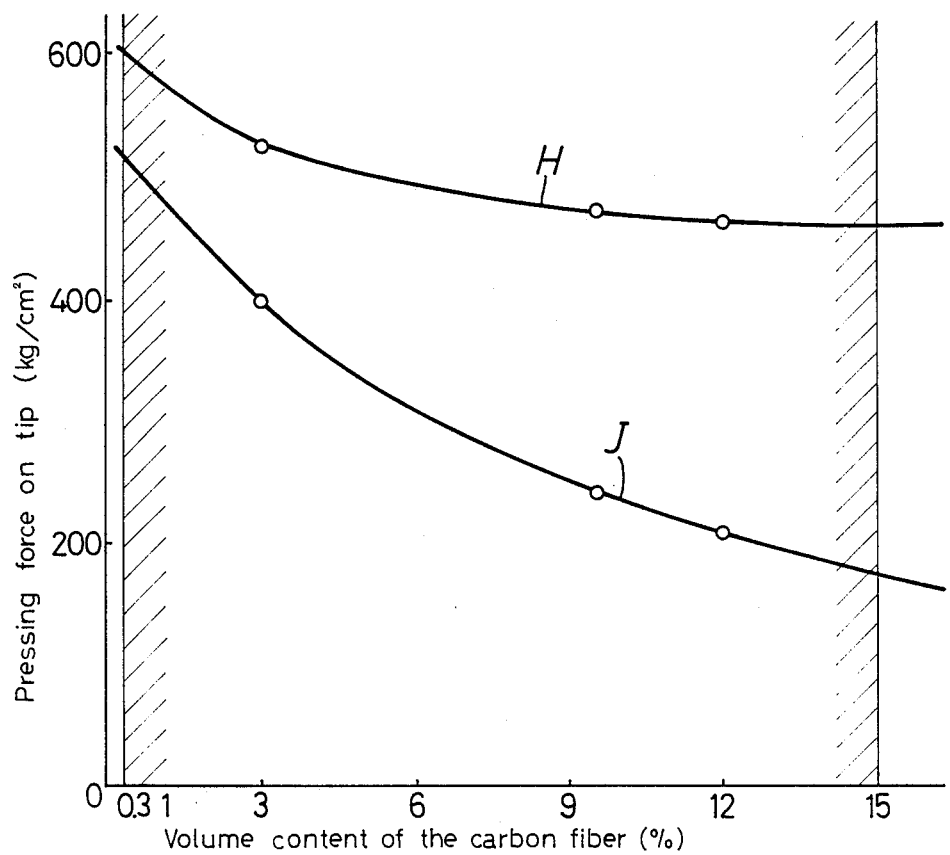
FIG. 8 is a graph showing the results of seizure limit tests on the assumption that the engine is in operation.

FIG. 8 shows the results of seizure limit tests under the assumption the engine is in operation, obtained by using the tip-on-disk type slide testing machine. According to the present invention represented by curve H, the disk was constructed of the above described aluminum alloy used for the inner wall 1a of the cylinder bore, the alumina fiber having the volume content of 12% and carbon fiber having a variety of volume contents. The tip was constructed in the same manner as the skirt portion 2a of the piston 2, i.e., of an aluminum alloy and a heat resistant synthetic resin layer 4 comprised of 15% by weight of MoS$_2$ particles, 25% by weight of thin copper pieces and 60% by weight of a polyamideimide resin.

According to the comparative example represented by curve J in FIG. 8, the disk was constructed in the same manner as that of the present invention but the tip was constructed by plating a steel layer on the aluminum alloy which forms the skirt portion 2a of the piston 2.

The testing method comprised rotating the disk at a speed of 20 m/sec., and pressing the slide surface of the tip onto the slide surface of the disk with a predetermined pressing force under a condition of a lubricating oil supply rate of 37.5 ml/min.

In the cae of the present invention represented by the curve H as is obvious from FIG. 8, the surface pressure of seizure limit is higher than that of the comparative example represented by the curve J. That is, the carbon fiber is poorly wet with the lubricating oil. Therefore, the oil film tends to be broken by the increase in the volume content of the carbon fiber and, hence, the surface pressure of seizure limit decreases. In the present invention represented by the curve H, a drop in the surface pressure of seizure limit is suppressed by the lubricating property of the heat resistant synthetic resin layer. In the comparative example represented by the curve J, however, the surface pressure of seizure limit drops drastically since no such lubricating property is obtained.

Figure 9:
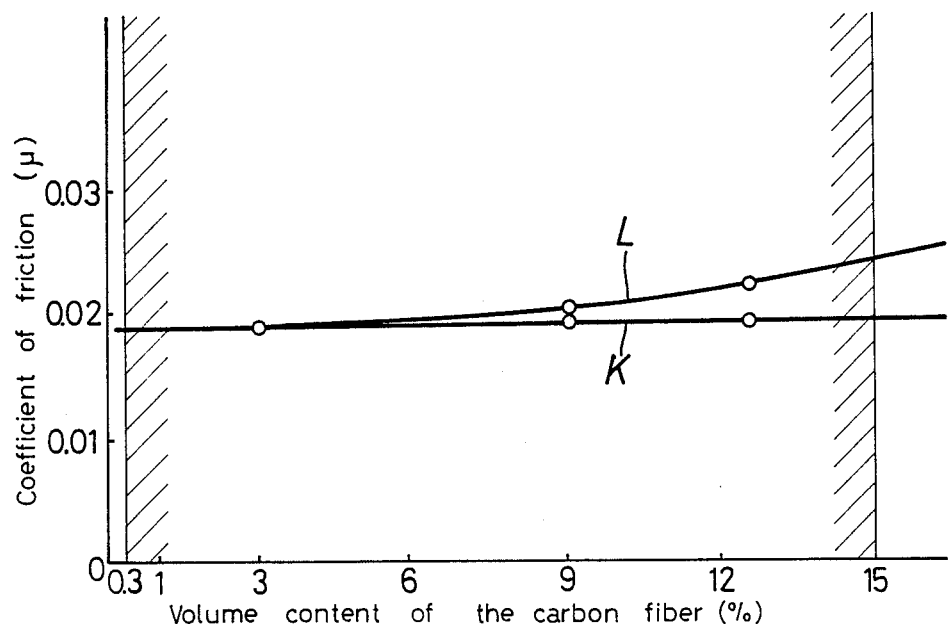
FIG. 9 is a graph showing the change in the coefficient of friction on the assumption that the engine is in operation.

FIG. 9 is a graph which shows the change in the coefficient of friction under the same testing conditions by using the disk and the tip that are constructed in the same way as described above. In the case of the present invention represented by line K, the coefficient of friction changes very little as a result of the lubricating property of the heat resistant synthetic resin layer. In the case of the comparative example represented by line L, however, the coefficient of friction increases with an increase in the volume content of carbon fiber.

In addition to the use of the present invention for cylinder blocks and pistons, examples of the combination of slidable members include those shown in the following Table II.

TABLE II

|  | First slidable member | Second slidable member |
| --- | --- | --- |
| Internal combustion engine | Piston ring | Piston (inner wall of ring groove) |
|  | Piston (inner wall of the ring groove) | Piston ring |
|  | Rocker arm | Rocker arm shaft |
|  | Piston pin | Connecting rod |
|  | Connecting rod | Piston pin |
|  | Piston pin | Piston (boss) |
|  | Piston (boss) | Piston pin |
| Compressor | Cylinder | Piston |
|  | Vane | Opposing sliding member |
|  | Opposing sliding member | Vane |
| Automatic transmission | Valve housing | Spool valve |

The foregoing list in Table II includes representative examples of the application of the present invention and is not intended to be exhaustive of all the applications of the present invention.

What is claimed is:

1. Cooperating slidable aluminum alloy members comprising first and second slidable aluminum alloy members that slide relative to each other, said first slidable aluminum alloy member having a slide portion of a fiber-reinforced aluminum alloy, comprised of an aluminum alloy and a reinforced fiber, said reinforcement fiber being a fiber mixture comprised of an alumina fiber of a volume content of 8.0 to 20.0% and a carbon fiber of a volume content of 0.3 to 15.5%, said alumina fiber having an alpha rate from 10.0% to 50.0%, the alumina fiber having a content of shots with an average particle size of 150 μm or more that are 2.5% or less by weight, said second slidable aluminum alloy member having a slide surface slidably engaging said slide portion of said first slidable aluminum alloy member, said slide surface being provided with a layer of heat resistant synthetic resin of thickness from 5 to 50 μm in which are dispersed a solid lubricant and an abrasion resistance improving agent, said solid lubricant including at least one selected from a group consisting of MoS$_2$ particles, BN particles, carbon particles and polytextrafluoroethylene particles, and said abrasion resistance improving agent being a copper containing fine substance.

2. Cooperating slidable aluminum alloy members according to claim 1, wherein said heat resistant synthetic resin includes one selected from a group consisting of a polyimide resin, a polyamide resin and a polyamideimide resin.

3. Cooperating slidable aluminum alloy members according to claim 1 or 2, wherein the total amount of said solid lubricant and said abrasion resistance improving agent is 50% or less by weight with respect to said heat resistant synthetic resin in said layer.

4. Cooperating slidable aluminum alloy members according to claims 1 or 2, wherein said first aluminum alloy member is a cylinder block for an internal combustion engine with the slide portion thereof being an inner wall of a cylinder bore, and the second aluminum alloy member is a piston for the internal combustion engine with the slide surface thereof being the outer peripheral surface of the piston.

* * * * *